(12) United States Patent
Rivers et al.

(10) Patent No.: US 7,182,317 B2
(45) Date of Patent: Feb. 27, 2007

(54) CEILING CORD PULLER PROPELLER

(75) Inventors: Paul Brent Rivers, Cullman, AL (US); Frederick James Diggle, III, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 208 days.

(21) Appl. No.: 10/725,672

(22) Filed: Dec. 2, 2003

(65) Prior Publication Data

US 2005/0116210 A1 Jun. 2, 2005

(51) Int. Cl.
*H02G 1/08* (2006.01)
(52) U.S. Cl. ............................................ 254/134.3 FT
(58) Field of Classification Search ........ 254/134.3 FT, 254/134.3 R; 124/26, 27
See application file for complete search history.

(56) References Cited

U.S. PATENT DOCUMENTS 4,056,859 A * 11/1977 Pace .................. 254/134.3 FT
5,582,392 A * 12/1996 Bajric et al. .......... 254/134.3 R
6,732,725 B2 * 5/2004 Doud .......................... 124/27
6,889,982 B1 * 5/2005 Gove .......................... 273/343

OTHER PUBLICATIONS

Dale Electronic Supply Co., 6 IN Foam Carrier, internet catalog, Oct. 15, 2003, http://www.dale-electric.com/detail.cfm?upc=78325031327&itemnumber=31-327, US.
Pigs Unlimited, Inc., Foam Pigs, internet catalog, Jan. 19, 2003, http://www.pigsunlimited.com/asp/prodtype.asp?prodtype=11&ph=cat&PT MasterCategory=y, US.
E Z Hang, internet catalog, Sep. 20, 2003, http://www.ezhang.com, US.
Sling-A-Line Wire Puller, internet catalog, Jan. 20, 2004, http://www.connectworld.net/cgi-bin/iec/LSD85-202, US.
Ya-Mak-A Footbag, internet catalog, Jan. 23, 2004, http://worldfootbag.com/catalog2/show/930, US.
Happy Face Footbag, internet catalog, Jan. 23, 2004, http://worldfootbag.com/catalog2/show/843, US.

* cited by examiner

*Primary Examiner*—Robert C. Watson
(74) *Attorney, Agent, or Firm*—Lee & Hayes, PLLC

(57) ABSTRACT

An apparatus for running wire includes a housing for a biasing member attached to a piston. A locking member retains the piston in a biased position and triggers release of the piston. The piston accelerates upon release and propels a pull string attached to a projectile toward a target.

21 Claims, 6 Drawing Sheets

CEILING CORD PULLER PROPELLER

TECHNICAL FIELD

The present invention is directed generally and in various embodiments to a device for propelling a cord puller through ceiling openings.

BACKGROUND

During installation of telecommunications equipment, a technician typically is required to run long lengths of electrical or communication wire through suspended ceilings, behind walls, under houses, and/or through channels (e.g., conduits, piping, ducts, etc.). In some cases, a technician may use a fish tape to run lines or wires. In particular, a technician may extend the fish tape into a cavity or a conduit until a desired termination point is reached. At the termination point, a wire or cable is then tied, taped, or attached to a tab at the end of the fish tape. As the technician retracts the fish tape, the wire or cable is drawn through the cavity or conduit. In some cases, additional lines or wires may be taped to the first line or wire.

In general, the process of running wire is quite labor intensive and time consuming. For example, significant time and energy may be expended in the course of climbing a ladder, dislodging ceiling panels, feeding wire through small openings, and negotiating confined spaces. Accordingly, it would be advantageous for technicians to employ devices and methods for running wire more efficiently.

SUMMARY

In one general aspect, a device includes a housing for a biasing member attached to a piston. A locking member retains the piston in a biased position and triggers release of the piston. The piston accelerates upon release and propels a pull string attached to a projectile toward a target.

Implementations may include one or more of the following features. For example, the pull string can be attached to one or more wires. The projectile can be a deformable sack containing weighted filler material. The projectile can include at least one fastener for attaching the pull string. The housing may be constructed as a tube having an open proximal end and a closed distal end. The biasing member may be a coil spring attached to the housing. The piston may include a notch or a groove for engaging the locking member. The piston may include one or more guide pins or a rod for moving the piston. One or more rails may be provided to shield the locking member from accidental triggering. The locking member may be a latch having a retaining member for engaging the piston.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. In addition, it will be appreciated that the characterizations of various components and orientations (e.g., vertical or horizontal, right or left, side, top, bottom, upper or lower) shown and described herein are relative characterizations only based upon the particular position or orientation of a particular embodiment.

FIGS. 1A–1D illustrate a device 10 according to one embodiment of the present invention. As shown, the device 10 includes a tube 11 having an enclosed distal (back) end 12 and an open proximal (front) end 13. In one embodiment, the tube 11 is constructed of a plastic material. In general, however, the tube 11 may be formed from a variety of suitable materials such as metals, alloys, polymeric materials, and ceramics and/or combinations thereof.

Examples of suitable materials include but are not limited to: metals and alloys such as aluminum, beryllium, brass, bronze, cast iron, copper, lead, magnesium, steel, tantalum, zinc, zirconium, and various other trademarked alloys; ceramics such as glass and porcelain; and plastics such as Acrylonitrile-butadiene-styrene (ABS) resin, acetal resin, acrylic resin, fluorocarbon polymer, nylon, phenolformaldehyde resin, polybutylene terephthalate, polycarbonate, polyethylene, polyphenylene oxide, polypropylene, polystyrene, reinforced plastics (FRP), ureaformaldehyde resin, acrylic, polyurethane, polyvinylchloride (PVC), thermoplastics, thermoset plastics, and any combinations and/or compositions thereof including fiber reinforced and carbon fiber reinforced combinations and/or compositions thereof.

In this embodiment, the tube 11 houses a coil spring 14. As shown, the coil spring 14 is connected at one end to the distal end 12 of the tube 11 and at another end to a piston 15. In general, the coil spring 14 and piston 15 are configured so that the coil spring 14 is compressed as the piston 15 is moved in the directed of the closed distal end 12. Although this embodiment depicts a tube 11 and a coil spring 14, the scope of the present invention is intended to encompass any type of housing containing any type of biasing member structured and arranged to accelerate the piston 15.

In one embodiment, the piston 15 is formed with a concave surface 16 for cradling a projectile and a notch 17 for engaging a locking member. The piston 15 also includes guide pins 18 protruding from each side. In general, the guide pins 18 prevent the piston 15 from rotating within the tube 11 and can be used as handles for moving the piston 15 toward the closed end 12. As shown, the guide pins 18 are structured and arranged to slide within corresponding slots 19 formed in sides of the tube 11. The slots 19 run lengthwise in the tube 11 and provide stabilization for the piston 15. The slots 19 also provide a bump stop for the guide pins 18 and prevent the piston 15 from exiting the open end 13 of the tube 11.

The device 10 further includes a latch 20 for retaining and triggering release of the piston 15. In this embodiment, the latch 20 includes a retaining member 21 for engaging the notch 17 in the piston. The device 20 also includes rails 22 for shielding the latch 20 from accidental triggering. Although this embodiment depicts a latch 20, the scope of the present invention is intended to encompass any type of locking member structured and arranged to hold the piston 15 in a biased or compressed position.

Figure 1A:
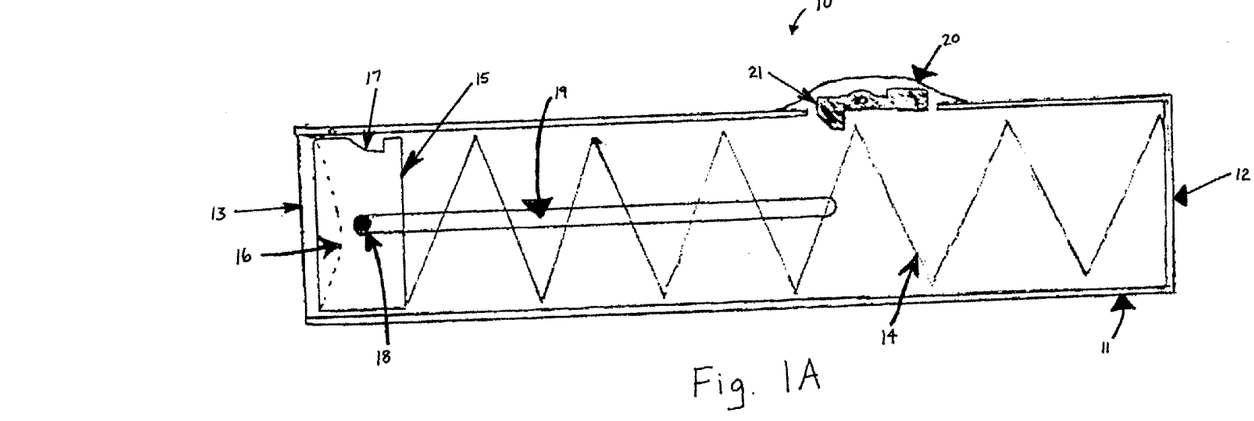
FIGS. 1A–1D illustrate an apparatus according to various embodiments of the present invention.
Figure 1B:
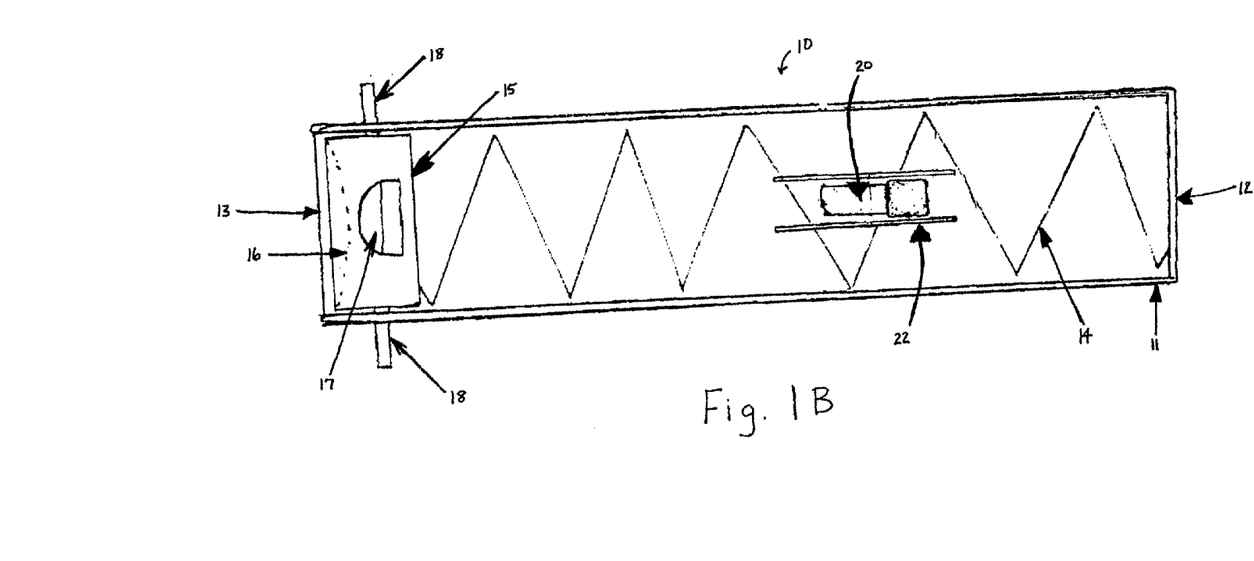

FIGS. 1A and 1B illustrate a side view and a top view, respectively, of the device 10 in an unloaded (e.g., preloaded or post-firing) condition. As shown, the spring 14 is in an uncompressed state with one end attached to the closed end 12 of the tube and another end attached to the piston 15. The piston 15 is proximate the open end 13 of the tube 11 with the guide pins 18 abutting the front ends of the slots 19.

Figure 1C:
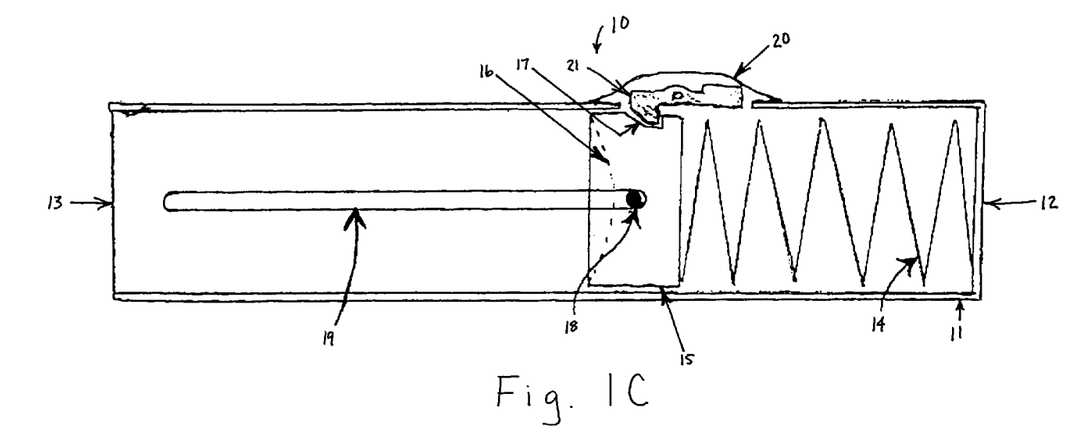
Figure 1D:
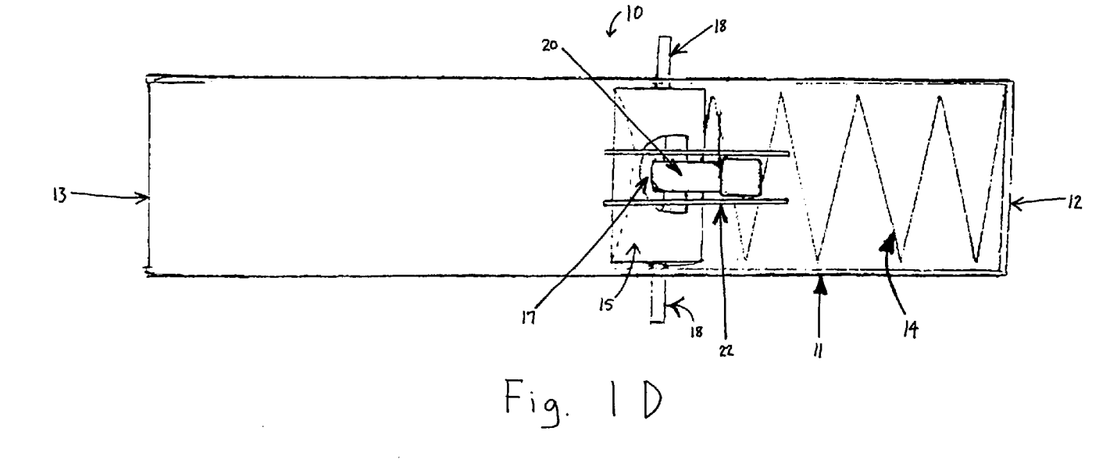

FIGS. 1C and 1D illustrate a side view and a top view, respectively, of the device 10 in a firing condition. As shown, the spring 14 is in a compressed state with one end attached to the closed end 12 of the tube and another end attached to the piston 15. The latch 20 holds the piston 15 through engagement of the retaining member 21 and the notch 17. The guide pins 18 abut the back ends of the slots 19.

Figure 2A:
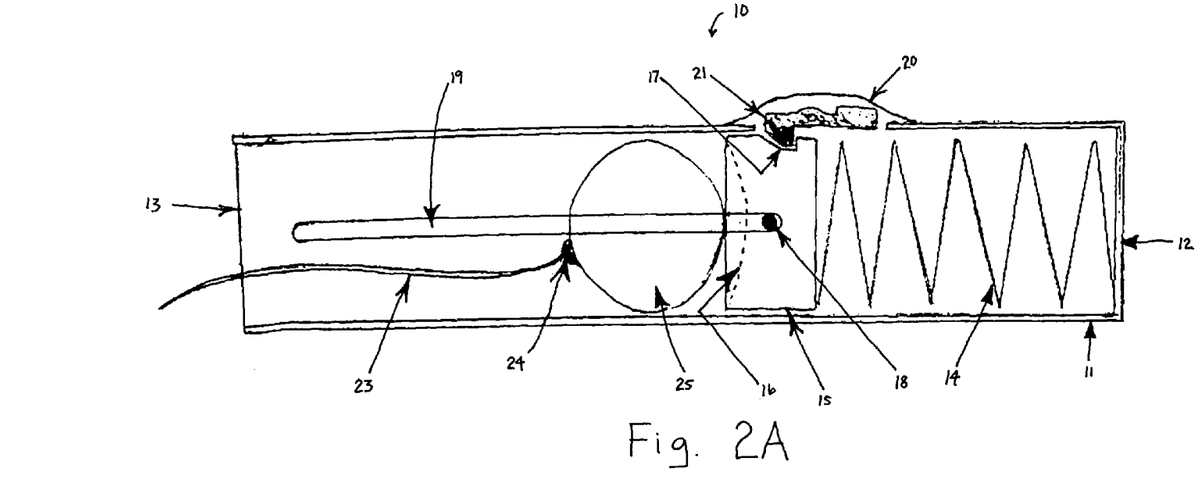
FIGS. 2A and 2B illustrate an apparatus according to various embodiments of the present invention.
Figure 2B:
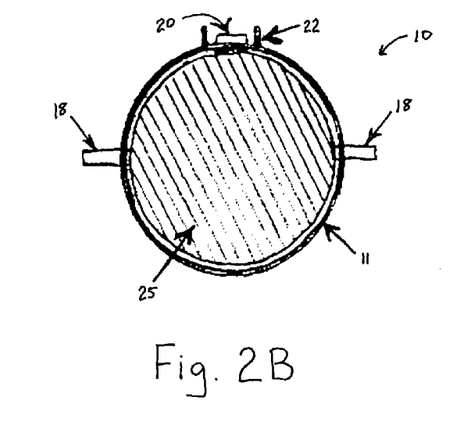

FIGS. 2A and 2B illustrate another embodiment of the device 10. As shown in FIG. 2A, the device 10 is in a firing condition. The spring 14 is in a compressed state with one end attached to the closed end 12 of the tube and another end attached to the piston 15. The latch 20 holds the piston 15 through engagement of the retaining member 21 and the notch 17. The guide pins 18 abut the back ends of the slots 19. In this embodiment, a pull string 23 is connected at one end to a fastener 24 on a projectile 25. In some cases, the projectile 25 nests within the concave face 16 of the piston 15.

In general, the device 10 is structured and arranged to propel the projectile 25 toward a desired target. In general, the project 25 may be any type of structure capable of being propelled a suitable distance for running wire. The pull string 23 can be used to pull electrical or communication wire (not shown). In one embodiment, the end of the pull string 23 is detached from the projectile 25 and wire is connected to same end the pull string 23. By pulling the other end of the pull string 23, the wire is drawn to a desired destination. In another embodiment, wire is attached to the end of the pull string 23 that is opposite to the end secured to the projectile 23. By pulling the projectile 25 or the attached end of the pull string 23, the wire is drawn to a desired destination.

The fastener 24 may include one or more various attachment members for releasably securing the pull string 23 to the projectile 25. Examples include, but are not limited to: a grommet, a ring, a clasp, a clamp, an adhesive, tape, complimentary pieces of hook and loop material, etc. In general, the fastener 24 can be positioned on the projectile 25 in various ways. For example, the position of the fastener 24 toward the center of the projectile 25 for instance provides a uniform distribution of the weighted filler whereas the position of the fastener 23 at or near an edge changes the flight and impact properties of the projectile 25. The position of the fastener 23 toward the rear of the projectile 25 may provide a concentrated distribution of the weighted filler.

In one embodiment, the projectile 25 includes a deformable sack containing a weighted filler material. The deformable sack may be formed from material such as, for example, polymeric material, nylon, cloth, leather, canvas, etc. and may be non-bounding or inelastic so as to prevent inadvertent misplacement when propelled to a landing position. The projectile 25 may include attached panels forming a pocket for the filler material or may be constructed as a uniform piece. The weighted filler may be made of any suitable material, such as, for example, metal shot, beads, beans, shot pellets, ball bearings, etc.

The projectile 25 also may include additional features such as, for example: a resealable opening (e.g., cap, zipper, complimentary pieces of hook and loop material) for adding or removing the weighted filler, a pocket for retaining a locating beacon (e.g., glowing stick, an audible beacon, a strobing light, a GPS device, etc.), a luminescent surface (e.g., reflective paint or reflective strips), and/or identifying indicia (e.g., a logo, bold colors, a bar code, etc).

FIG. 2B illustrates a front view of the device 10. As shown, a projectile 25 is loaded within the tube 11. The guide pins 18 extend outwardly from the piston (not shown) located behind the projectile 25. The rails 22 are structured and arranged to shield the latch 20 against accidental firing. Although the embodiment shown in FIG. 2B depicts the device 10 as having a cylindrical tube 11, the scope of the present invention is intended to encompass a device 10 having any shape or form for performing the functions described herein.

FIGS. 3A–3F illustrate a device 30 according to one embodiment of the present invention. As shown, the device 30 includes a tube 31 having a distal (back) end 32 and an open proximal (front) end 33. The tube 31 may be formed from a variety of suitable materials such as metals, alloys, polymeric materials, and ceramics and/or combinations thereof.

In this embodiment, the tube 31 houses a coil spring 34. As shown, the coil spring 34 is connected at one end to the distal end 12 of the tube 11 and at another end to a piston 55. In general, the coil spring 34 and piston 35 are configured so that the coil spring 34 is compressed as the piston 35 is moved in the directed of the closed distal end 12. Although this embodiment depicts a coil spring 34, the scope of the present invention is intended to encompass any type of biasing member structured and arranged to accelerate the piston 35 within the tube 31.

In this embodiment, the piston 35 is formed with a concave surface 36 for cradling a projectile and a circumferential groove 37 for engaging a locking member. The device 10 also includes a plunger handle 18 protruding from the distal end 32. The handle 18 is connected to a rod 39, which is, in turn, connected to the piston 15. In general, the handle 18 is used for moving the piston 35 toward the distal end 32. The handle 18 also provides a bump stop when the spring 34 and piston 35 are fully extended toward the open end 33 of the tube 31.

The device 30 further includes a latch 40 for retaining and triggering release of the piston 35. In this embodiment, the latch 40 includes a retaining member 41 for engaging the groove 37 in the piston. The device 30 also includes rails 42 for shielding the latch 40 from accidental triggering. Although this embodiment depicts a latch 40, the scope of the present invention is intended to encompass any type of locking member structured and arranged to hold the piston 35 in a biased or compressed position.

Figure 3A:
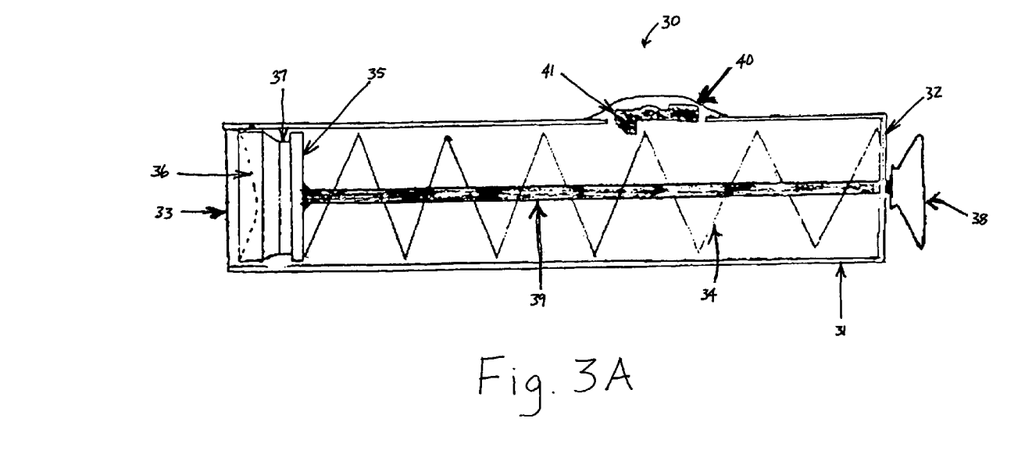
FIGS. 3A–3F illustrate an apparatus according to various embodiments of the present invention.
Figure 3B:
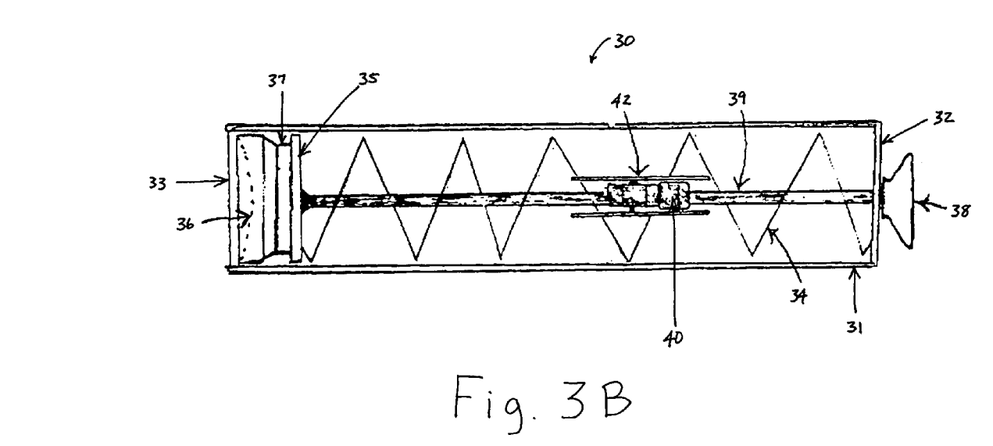

FIGS. 3A and 3B illustrate a side view and a top view, respectively, of the device 30 in an unloaded (e.g., preloaded or post-firing) condition. As shown, the spring 34 is in an uncompressed state with one end attached to the distal end 32 of the tube and another end attached to the piston 35. The piston 35 is proximate the open end 33 of the tube 31 with the handle 38 abutting the distal end 32 of the tube 31.

Figure 3C:
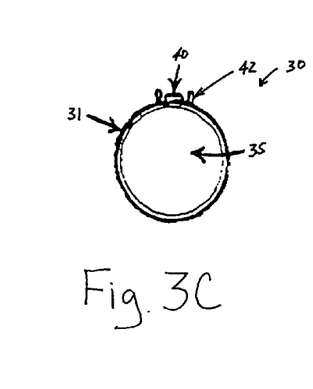
Figure 3D:
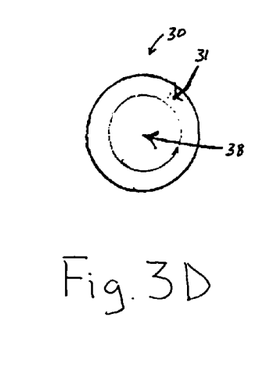

FIGS. 3C and 3D illustrate a front view and a back view, respectively, of the device 30. As shown, in FIG. 3C, the piston 35 resides within the tube 31, and rails 42 extend above and shield latch 40. As shown in FIG. 3D, the handle 38 extends from the tube 31. Although the embodiment shown in FIGS. 3C and 3D depicts the device 30 as having a cylindrical tube 31, the scope of the present invention is intended to encompass a device 30 having any shape or form for performing the functions described herein.

Figure 3E:
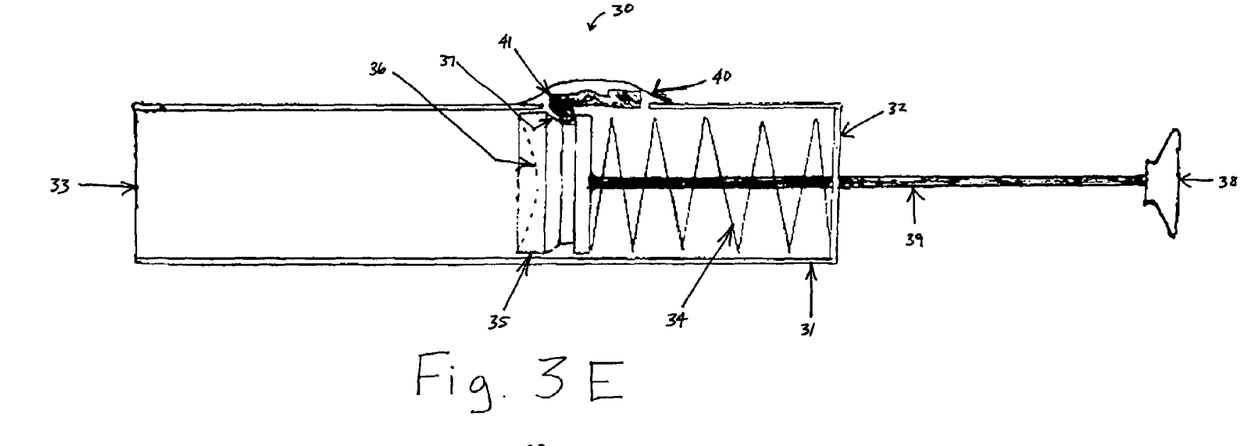
Figure 3F:
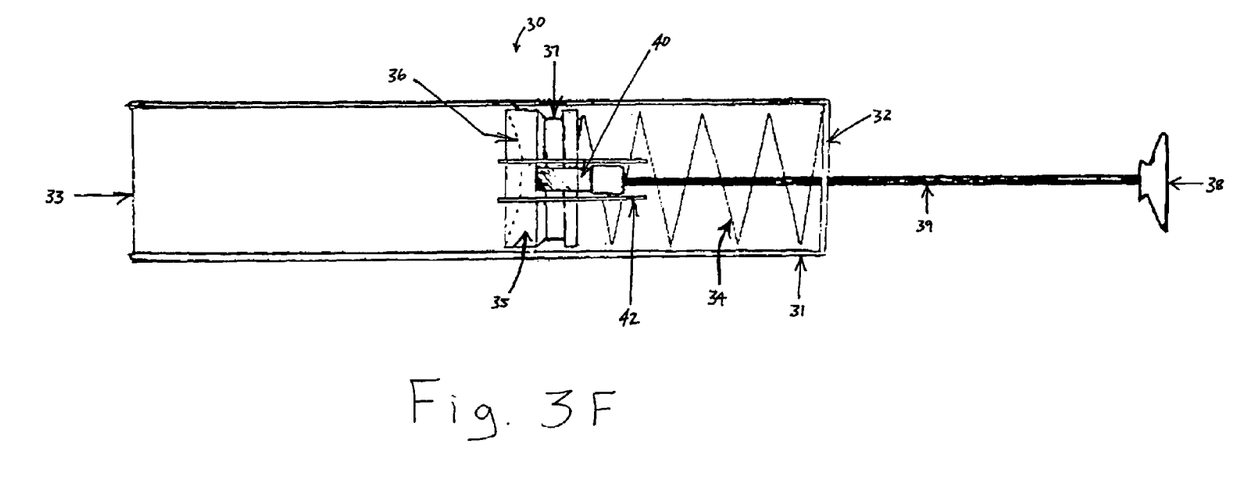

FIGS. 3E and 3F illustrate a side view and a top view, respectively, of the device 30 in a firing condition. As shown, the spring 34 is in a compressed state with one end attached to the distal end 32 of the tube and another end attached to the piston 35. The latch 40 holds the piston 35 through engagement of the retaining member 41 and the groove 37. The rod 39 extends outwardly from the distal end 32 of the tube 31.

Figure 4:
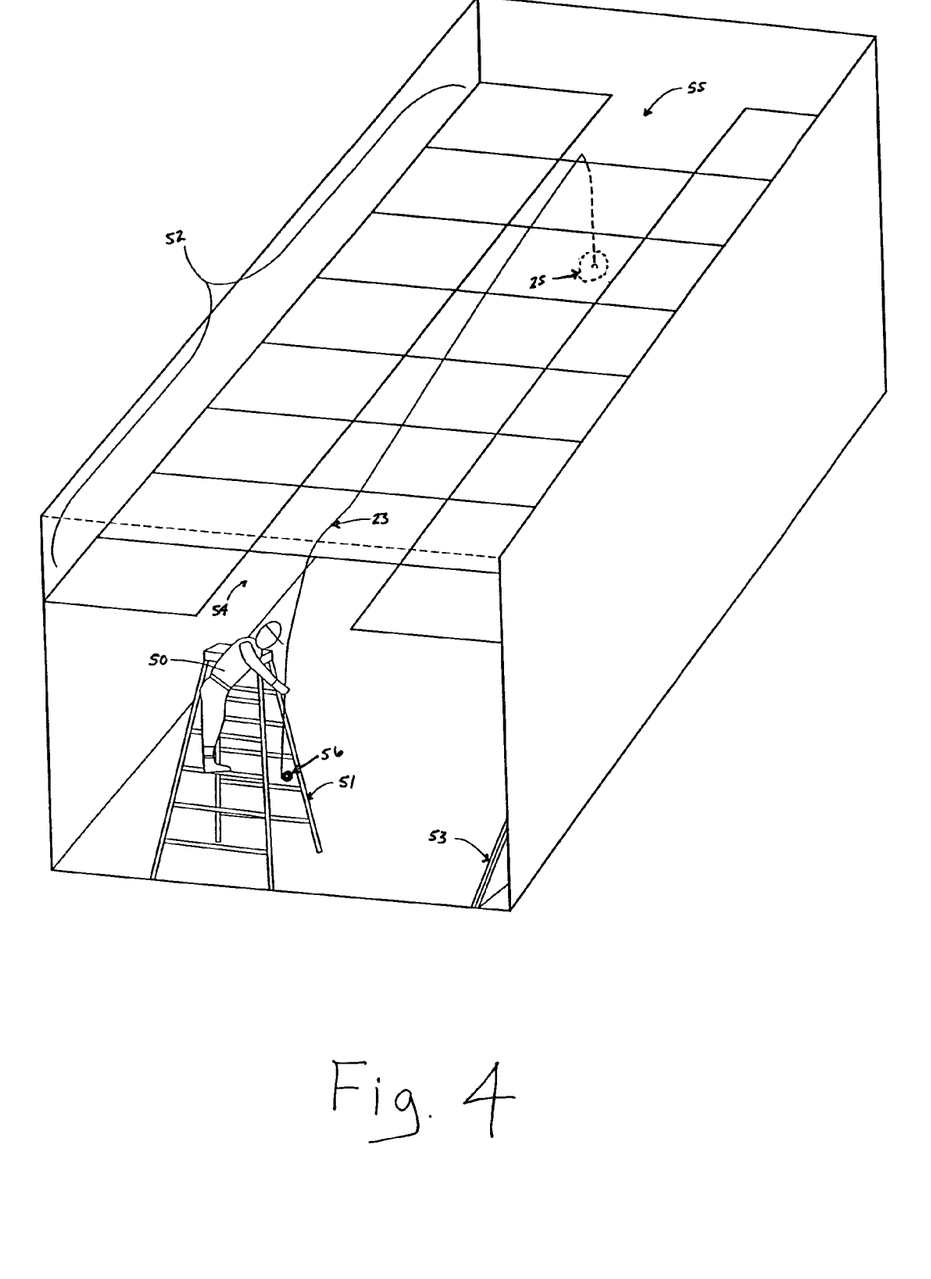
FIG. 4 illustrates an apparatus according to various embodiments of the present invention.

FIG. 4 illustrates use of one embodiment of a propelling device (e.g., device 10 or 30). In one implementation, a technician 50 can utilize a ladder 51 to climb up to a suspended ceiling 52 and remove one or more ceiling tiles 53. As shown, two ceiling panels 53 have been removed from opposite sides of the ceiling 52 to create a first opening 54 and a second opening 55 in the suspended ceiling 52. In general, the technician 50 removes a sufficient number of ceiling tiles 53 to create a path to a desired target.

The technician 50 then employs a propelling device (e.g., device 10 or 30) to propel the projectile 25 through the first opening 54 in the suspended ceiling 52 toward a desired target such that the projectile 25 is accessible through the second opening 55. As depicted, the technician 50 has propelled the projectile 25, and a pull string 23 is secured at one end to the projectile 25. The pull string 23 runs in through the first opening 54 in the suspended ceiling 52 and out through the second opening 55 in the suspended ceiling 52. In this embodiment, the pull string 23 is secured at its other end to one or more wires 56 which can be pulled through the suspended ceiling 52 to the desired target. In another embodiment, the end of the pull string 23 can be detached from the projectile 25 and connected to one or more wires. Pulling the opposite end of the pull string 23 draws the wire to a desired destination.

Although the embodiment shown in FIG. 4 depicts the use of a propelling device to run electrical or communication wire through suspended ceilings, the scope of the present invention is intended to encompass various uses of a propelling device to run electrical or communication wire behind walls, under houses, and/or through channels (e.g., conduits, piping, ducts, etc.).

It can be appreciated that the design and/or use of the propelling devices may be required to comply with applicable manufacturing and/or operating standards. Furthermore, technicians may be required to be trained to use the propelling device. In addition, technicians also must be equipped with suitable eye, ear, and face protection during use of the propelling device.

In general, the various and several embodiments provide a convenient apparatus for running wires. The examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention. The configuration and specific functions of a particular support device or driver, for example, are provided merely for convenience of disclosure.

It also can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. An apparatus for running wire, the apparatus comprising:
   a projectile launcher, comprising:
      a housing including a cylindrical tube having an open proximal end and a closed distal end:
      a biasing member attached to a piston comprising a concave face within the cylindrical tube; and
      a locking member for retaining the piston in a biased position and for triggering release of the piston,
   a pull string within the cylindrical tube,
   a deformable projectile within the cylindrical tube, wherein the deformable projectile is adapted to connect to the pull string;
   wherein the piston cradles the projectile, accelerates along the cylindrical tube upon release and propels the pull string attached to the deformable projectile toward a target, and
   wherein the projectile and the pull string are not connected to the projectile launcher upon release of the piston.

2. The apparatus of claim 1, wherein the pull string is attached to one or more wires.

3. The apparatus of claim 1, wherein the projectile comprises a deformable sack containing weighted filler material.

4. The apparatus of claim 1, wherein the projectile further comprises at least one fastener.

5. The apparatus of claim 4, wherein the pull string is attached to at least one fastener.

6. The apparatus of claim 1, wherein the biasing member comprises a coil spring.

7. The apparatus of claim 6, wherein the coil spring is attached to the housing.

8. The apparatus of claim 1, wherein the piston includes a notch for engaging the locking member.

9. The apparatus of claim 1, wherein the piston includes a groove for engaging the locking member.

10. The apparatus of claim 1, wherein the piston includes one or more guide pins for moving the piston.

11. The apparatus of claim 2, wherein the one or more guide pins slide within corresponding slots in the housing.

12. The apparatus of claim 1, wherein the piston includes a rod for moving the piston.

13. The apparatus of claim 12, wherein the rod includes a plunger handle extending from the housing.

14. The apparatus of claim 1, further comprising one or more rails shielding the locking member from accidental triggering.

15. The apparatus of claim 1, wherein the locking member comprises a latch.

16. The apparatus of claim 15, wherein the latch comprises a retaining member for engaging the piston.

17. An apparatus for running wire, the apparatus comprising:
 projectile launching means, comprising:
  a piston comprising a concave face;
  biasing means for accelerating the piston, wherein the biasing means is attached to the piston; and
  locking means for retaining the piston in a biased position and for triggering release of the piston, wherein the piston accelerates upon release; and
 a pull string;
 a deformable projectile attached to the pull string;
 wherein the deformable projectile is nested to the concave face of the piston:
 wherein release of the piston propels The pull string attached to the deformable projectile toward a target; and
 wherein the deformable projectile and the pull string are not connected to any portion of the projectile launching means upon release of the piston.

18. The apparatus of claim 1, the projectile further comprising a locating beacon.

19. The apparatus of claim 1, the projectile further comprising a luminescent surface.

20. An apparatus for running wire, comprising:
 a housing comprising an open proximal end and a closed distal end;
 a piston comprising a concave face, The piston at least partially enclosed within the housing;
 a coil spring, the coil spring attached to the piston and at least partially enclosed within the housing;
 a locking device, comprising:
  a lock; and
  a trigger, the lock configured to hold the coil spring in a compressed position and the trigger configured to release the coil spring from the compressed position when the trigger is activated; and
 a projectile, comprising:
  a deformable sack, wherein the deformable sack is inelastic;
  weighted material;
  an attaching mechanism configured to attach a wire to the projectile; and
  a locating beacon;
 wherein the projectile is configured to nest within the concave face of the piston and to sit within the housing;
 wherein the projectile is propelled upon activation of the trigger; and
 wherein the projectile and the wire are entirely disconnected from the apparatus upon activation of the trigger and exit from the housing.

21. The apparatus of claim 20, wherein the locating beacon comprises one of: a glowing stick, an audible beacon, a strobing light, or a GPS device.

* * * * *